March 12, 1940. A. I. INNES 2,192,973
SEISMIC SURVEYING
Filed Nov. 4, 1937
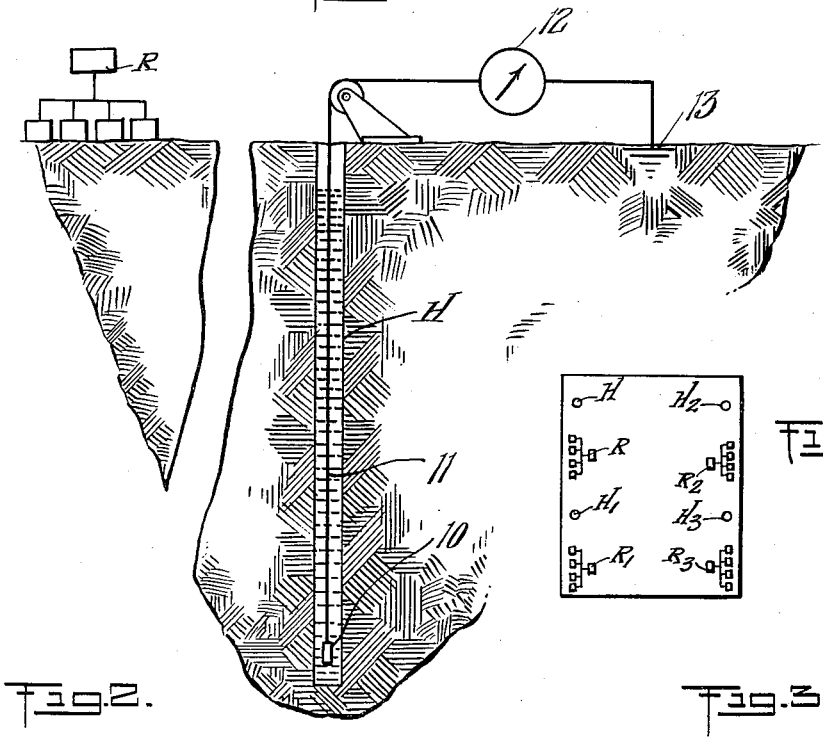
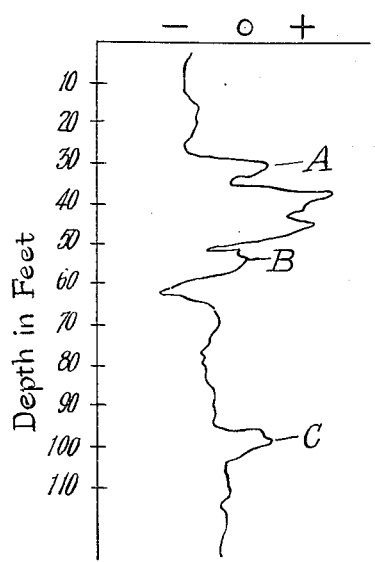
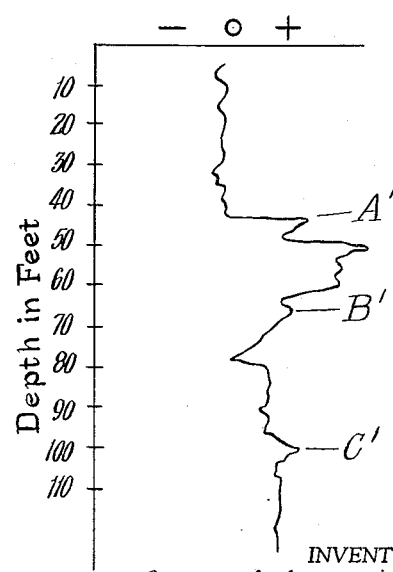
INVENTOR.
Arland I. Innes
BY Kenyon & Kenyon
ATTORNEYS.

Patented Mar. 12, 1940

2,192,973

UNITED STATES PATENT OFFICE 2,192,973

SEISMIC SURVEYING

Arland I. Innes, Fort Worth, Tex., assignor to Geophysical Research Corporation, New York, N. Y., a corporation of New Jersey Application November 4, 1937, Serial No. 172,691

2 Claims. (Cl. 181—0.5)

This invention relates to seismic surveying and has for its object a method of selecting the most suitable depth at which to plant the seismic charge in a shot hole.

In making seismic surveys by the reflection method, it is customary to plant the explosive charge in a shot hole at a depth below the surface which may be as little as ten feet or as much as 300 feet. In many areas, the exact depth at which the shot is planted is not at all critical and clear-cut reflections are obtainable with the charge planted at any one of a variety of depths. In other areas, the quality of the reflections is independent of the depth at which the shot is planted provided the shot is planted below the existing water table. Still other areas are characterized by a surface layer of such nature that the depth at which the charge should be planted for high quality results is quite critical and a seismic charge detonated at some depth or depths in a bore hole in such layer produces a seismic record which is not correlatable with other records obtained by detonating seismic charges in other holes in the same area.

In such areas, it has heretofore been difficult to determine the best depth at which to plant the shot and one prior practice which has been used consists of making a record of the type of material found in a shot hole at different depths while drilling the hole and then placing the shot in that type of material which, by experiment, has been found to give the best results in that area. This method is impractical in many cases due to the fact that it is very difficult to prepare such a record when the holes are dug by portable rotary drilling rigs of the type customarily used for the purpose. In order to obtain accurate logs of the holes, it is necessary to use drilling methods of a type that are more costly than it is practical to use. Furthermore, even if accurate drilling logs are obtained, this method frequently fails because the quality of the reflection seems to be dependent upon other factors in addition to that of the material in which the charge is planted. Another prior procedure is to detonate charges at several depths in each shot hole, take a separate record of each shot and then choose for use that record which most closely resembles in character similar records taken in other shot holes in the area under investigation. This procedure involves the making of a large number of records of which no use is made and the attendant expense of the explosive charges and the labor involved.

According to the present invention, when starting work in a new area, a test hole is dug somewhat deeper than the lowest depth at which it is expected to fire a shot. A natural earth potential survey of the test hole is made according to any of the well-known methods such, for example, as the one described in Schlumberger Patent No. 1,913,293. Such survey need not measure accurately the natural earth potential at a given depth, but need merely provide a record indicating how the natural earth potential changes with depth. From the data thus obtained is plotted a natural earth potential-depth graph showing how natural earth potential varies with depth. A large number of seismic reflection records are then made, each record being made with the detector planted in the same position but with the seismic charge planted at a different depth in the test hole. From these records is determined the depth from which the best quality record was obtained and on the natural earth potential-depth graph above referred to, is indicated that depth at which the best quality reflection record was obtained from the test shots.

Similar natural earth potential-depth logs are made of each shot hole to be used in surveying the area, these logs, of course, being made before shots are fired in the holes. The log of each individual shot hole is compared with the log of the test hole and a correlation made between them. By such correlation is determined the depth in each shot hole which corresponds to the depth of the shot in the test hole from which the best quality record was obtained. The seismic charge is then planted in each hole at the depth so determined for such hole.

The above process may be more clearly understood by reference to the following specification and accompanying drawing, wherein:

Fig. 1 illustrates the procedural steps involved in the practice of the invention;

Fig. 2 is a graph illustrating the natural earth potential record of the test hole;

Fig. 3 is a graph illustrating the natural earth potential record of another hole, and Fig. 4 represents an area under survey.

A metal electrode 10 is attached to a single conductor cable 11 and means (not shown) is provided for raising and lowering the electrode 10 in the test hole H. The end of the cable 11 is connected through a millivolt meter 12 or other suitable voltage measuring instrument with an electrode 13 embedded in the ground. With the test hole filled either with water or drilling mud, the electrode 10 is lowered slowly into the test hole and readings are made of the voltage registered by the voltmeter 12 at different positions of the electrode. From the data thus obtained, the graph shown in Fig. 2 is plotted, the graph voltage against depth being representative of the variation of the natural earth potential with depth. A plurality of explosive charges are detonated at different depths in the hole H and reflection records of the waves thus produced are made at a recording station consisting of a plurality of wave detectors associated in the well-known manner with recorder R (Figure 1). The reflection records thus obtained are inspected and from such records is selected the record having the best quality, the selection being made on the basis of the judgment of the individual whose duty it is to make the selection and determination is made as to the depth of the charge resulting in the best reflection record.

Assume that the reflection record selected as having the best quality was obtained from a shot in the hole H at a depth of 96 feet. The point on the graph of Fig. 2 corresponding to said depth is determined and for reference purposes is labeled C.

A natural earth potential graph is made for each of a plurality of shot holes $H_1$, $H_2$ and $H_3$ in the area under survey, such shot holes having associated therewith respectively recording stations $R_1$, $R_2$, $R_3$ as shown in Fig. 4. In Fig. 3 is illustrated a natural earth potential graph for one of such holes, for example, $H_1$ and by comparison of Figs. 2 and 3, it is apparent that the point A' on the graph of Fig. 3 corresponds to the point A of Fig. 2, that the point B' on the graph of Fig. 3 corresponds to the point B on the graph of Fig. 2, and that the point C' on the graph of Fig. 3 corresponds to the point C on the graph of Fig. 2. Also, it will be apparent from these graphs that corresponding points thereon indicate different depths in the two holes. The graph of Fig. 3 shows that in the hole $H_1$ there exists at a depth of 102 feet (corresponding to the point C') a natural earth potential condition corresponding to the natural earth potential condition in the hole H at the depth of 96 feet (corresponding to the point C). Therefore, the explosive charge is planted in the hole $H_1$ at the depth of 102 feet so that it will be fired under the same natural earth potential condition as was the shot in the hole H, which gave the best quality record and consequently the record obtained from such shot in the hole $H_1$ will be the best quality record obtainable at any depth in the hole $H_1$.

It is apparent that some variation in the above procedure may be made. In particular, the natural earth potential log of the test shot hole may be made after the test shots have been detonated therein, provided the hole remains open after the shooting. Another possibility is planting the test shot in one hole and making the natural earth potential survey in a separate hole closely adjacent thereto.

Although this invention is primarily concerned with the art of seismic surveying by the reflection method, it is also applicable to the seismic refraction method. In the former case, the object of the invention is to find that depth at which the charge should be planted to give best reflection quality; in the latter case to find at which depth the charge should be planted to produce maximum seismic energy. The applicability of the invention to the refraction method is somewhat limited because of the very large charges of explosive customarily used.

I claim:

1. In the method of seismic surveying by correlation of reflection records produced by detonation of explosive charges in bore holes in an area characterized by a surface layer of such nature that a seismic charge detonated at some depth or depths in the bore hole produces a seismic record which is not correlatable with records obtained by detonating seismic charges in other similar bore holes, the procedure which consists in drilling a test hole, making a natural earth potential-depth graph of the material traversed by said test hole, shooting charges at different depths in said test hole, making a record of the seismic waves produced by each shot, determining the depth of the shot which produces the best record, establishing the corresponding point on said test hole natural earth potential-depth graph, drilling additional shot holes, making a natural earth potential-depth graph for each additional shot hole, selecting the point on each such graph which correlates with said point on the test hole natural earth potential-depth graph, establishing the depth in each additional shot hole corresponding to the point so selected and shooting an explosive charge at such depth in each additional shot hole.

2. In the method of seismic surveying by correlation of reflection records produced by detonation of explosive charges in bore holes in an area characterized by a surface layer of such nature that a seismic charge detonated at some depth or depths in the bore hole produces a seismic record which is not correlatable with records obtained by detonating seismic charges in other similar bore holes, the procedure which consists in drilling a test hole, making a natural earth potential-depth graph of the material traversed by said test hole, shooting test charges at different depths in said test hole, making a reflection wave record of each test shot, determining the depth of the test shot which produces the best quality reflection record, establishing the corresponding point on said test hole natural earth potential-depth graph, drilling additional shot holes, making a natural earth potential-depth graph for each additional shot hole, selecting a point on each such graph which correlates with said point on the test hole natural earth potential-depth graph, establishing the depth in each additional shot hole corresponding to the point so selected and shooting an explosive charge at such depth in each additional shot hole.

ARLAND I. INNES.